United States Patent
Abe et al.

(10) Patent No.: US 6,289,121 B1
(45) Date of Patent: Sep. 11, 2001

(54) METHOD AND SYSTEM FOR AUTOMATICALLY INPUTTING TEXT IMAGE

(75) Inventors: Yasushi Abe; Shiori Oaku, both of Kanagawa; Takashi Saitoh, Sagamihara; Tsukasa Kohchi, Yokohama, all of (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 08/985,826

(22) Filed: Dec. 5, 1997

(30) Foreign Application Priority Data

Dec. 30, 1996 (JP) .................................................. 8-358835

(51) Int. Cl.⁷ ................................. G06K 9/34; H04N 1/04
(52) U.S. Cl. ............................ 382/175; 382/180; 358/474
(58) Field of Search ...................................... 382/175, 180, 382/181, 182; 434/112; 348/62; 358/451–454

(56) References Cited

U.S. PATENT DOCUMENTS

| | | | |
|---|---|---|---|
| 4,379,283 | * | 4/1983 | Ito et al. ................................. 382/194 |
| 4,589,144 | * | 5/1986 | Namba ................................. 382/175 |
| 5,159,667 | * | 10/1992 | Borrey et al. ........................ 395/761 |
| 5,325,213 | * | 6/1994 | Takahashi et al. .................... 358/474 |
| 5,438,630 | * | 8/1995 | Chen et al. ............................ 382/159 |
| 5,550,614 | * | 8/1996 | Motoyama ............................ 399/18 |
| 5,682,227 | * | 10/1997 | Taguchi et al. ........................ 355/25 |
| 5,751,446 | * | 5/1998 | Fujioka ................................. 358/474 |
| 5,848,191 | * | 12/1998 | Chen et al. ............................ 382/229 |
| 5,850,476 | * | 12/1998 | Chen et al. ............................ 382/177 |
| 5,956,726 | * | 9/1999 | Aoyama et al. ...................... 707/102 |

FOREIGN PATENT DOCUMENTS

| | | |
|---|---|---|
| 6-168276 | 6/1994 | (JP) . |
| 6-282571 | 10/1994 | (JP) . |
| 6-289672 | 10/1994 | (JP) . |
| 8-37584 | 2/1996 | (JP) . |
| 9-166938 | 6/1997 | (JP) . |

* cited by examiner

Primary Examiner—Amelia M. Au
Assistant Examiner—Martin E Miller
(74) Attorney, Agent, or Firm—Knoble & Yoshida, LLC (57) ABSTRACT

An automatic text inputting method and a system inputs text from multiple pages such as in a book by automatically turning pages, optically converting text image on each page into character data and determining an end of a specified unit of text. For example, the specified unit of text includes an article in a magazine and a chapter in a book. Additionally, in a selected group of text, a representative word is also automatically selected.

22 Claims, 10 Drawing Sheets

METHOD AND SYSTEM FOR AUTOMATICALLY INPUTTING TEXT IMAGE

FIELD OF THE INVENTION

The current invention is generally related to a method and a system for automatically and or selectively inputting text image such as in a book into a digital character data, and more particularly related to a method and a system for inputting text from a book by automatically turning pages, optically converting text image into character data and determining an end of a specified unit of text.

BACKGROUND OF THE INVENTION

In order to process a large amount of textual information contained in multiple pages, various systems and methods have been implemented for inputting the textual image into a digital memory device. Such voluminous information has been generally contained in books. To input textual information contained in a book, each page has to be scanned, and the scanned image has be converted into digital character data via optical character recognition (OCR). Because pages of books are generally bound, the textual image on each page has to be turned by a human before it is scanned. This page turning process is not only tedious and time-consuming, but also is a source of errors. To substantially eliminate this human intervention, for example, Japanese Patent Hei 6-289672 discloses an automatic page turner or a book page turning device for image-duplicating machines such as photo copiers.

After textual information from a book is scanned, some preliminary processes have to take place prior to converting the scanned textual image via OCR. Japanese Patent Hei 8-37584 discloses various processes for adjusting scanned image depending upon a copying mode as well as a type of binding on an original material. These processes generally improve a certain artifacts caused by the bound material. Japanese Patent Hei 9-166938 discloses a system and a method of substantially eliminating a shadow in an scanned image caused by some depressed area in the center of a bound material when it is placed face down on a flat scanning surface. These improved scanned images are used to generate character data based upon optical character recognition.

To organize and retrieve the above described textual information, one approach is to select a key word and attach the key word to the text. Japanese Patent 6-282571 discloses a method and a system for selecting a key word from text data primarily based upon frequency in occurrence of words. Based upon the selected key word, the text is desirably organized. To retrieve the stored textual information, Japanese Patent Laid Publication 6-168276 discloses a display technique for displaying digitally converted information during a search session.

The above described prior art attempts lack a systematic inputting method and system for identifying a predetermined unit such as an article and a chapter in a bound material. Such an automatic selection mechanism is desired since a portion of textual information is necessary from a single bound volume.

SUMMARY OF THE INVENTION

In order to solve the above and other problems, according to a first aspect of the current invention, a method of inputting text from multiple pages into a digital memory device, including the steps of: a) automatically turning a page; b) scanning text on the page for optically converting the text into a predetermined format of digital data; and c) determining an end of a predetermined unit of the text in the digital data.

According to a second aspect of the current invention, a method of inputting text from multiple pages into a digital memory device, including the steps of: a) automatically turning a page; b) scanning text on the page for optically converting the text into a predetermined format of digital data; c) dividing the digital data into portions; and d) determining a representative word for each of the portions.

According to a third aspect of the current invention, a system for inputting text from multiple pages into a digital memory device, including: a page turner for automatically turning each of the multiple pages, each page having text; a scanner/optical character recognizer located near the page turner for scanning and converting the text on the multiple pages into a predetermined form of digital data; and a searcher operationally connected to the scanner/optical character recognizer for determining an end of a predetermined unit of the text in the digital data.

According to a fourth aspect of the current invention, a system for inputting text from multiple pages into a digital memory device, including: an automatic page turner for automatically turning a page, each page containing text; a scanner/optical character recognizer operationally connected to the automatic page turner for scanning the text for optically converting the text into a predetermined format of digital data; a text divider operationally connected to the scanner/optical character recognizer for dividing the digital data into portions; and a representative word selector operationally connected to the text divider for selecting a representative word for each of the portions.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
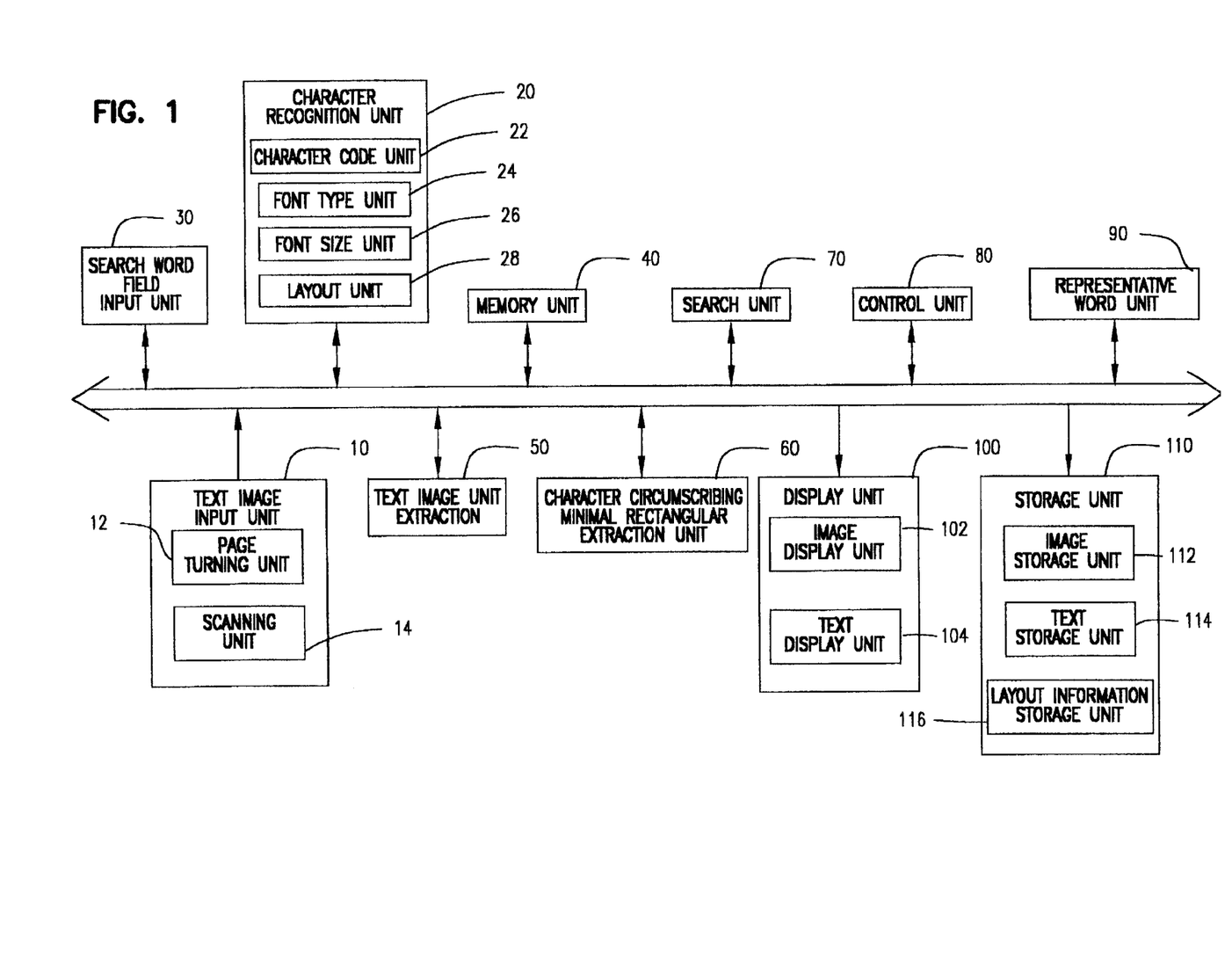
FIG. 1 is a block diagram illustrating one preferred embodiment of the automatic page turning text input system according to the current invention.

Referring now to the drawings, wherein like reference numerals designate corresponding structure throughout the views, and referring in particular to FIG. 1, a block diagram illustrates one preferred embodiment of the system for automatically and or selectively inputting a predetermined unit of text image from a bound material according to the current invention. A text image input unit 1 generally include a page turning unit 12 as well as an optical scanner unit 14. The scanner unit 14 scans text image on an image-carrying medium such as sheet of paper in a bound material such as a book The bound material is placed on a scanning surface so that the scanner 14 scans a predetermined number of pages at a time. The page turning unit 12 then turns at least one page so as to repeat scanning. As will be later discussed in detail, a control unit 80 controls the page turning unit 12.

Still referring to FIG. 1, the scanned text image is processed by a text image extraction unit 50, a character circumscribing minimal extraction unit 60, and a character recognition unit 20 performing a process such as optical character recognition (OCR) so that the text image is converted into character data. Initially, since the scanned image may include image other than text such as photographic images, the text image extraction unit 60 isolate the text image from the scanned image. Within the isolated textual image, the character circumscribing minimal rectangular extraction unit 60 further extracts character row areas which are circumscribed by minimal rectangles. Character images contained in these character row rectangular areas now converted into character data by the character recognition unit 20. The character recognition unit 20 includes a character code 22 for generating a character code, a font type unit 24 for determining a font type, a font size unit 26 for determining a font size and a layout unit 28 for determining a layout. These units respectively generate information and temporarily store in a memory unit 40. Based upon the above determined information, the character recognition unit 20 generates a character code or character data.

In general, the above textual information is stored in a storage unit 110 and is also displayed by a display unit 100. The storage unit 110 includes an optional image storage unit 112 for storing images associated with the text, a text storage unit 114 for storing converted character code or data and an optional layout information storage unit 116 for storing textual layout information. The display unit 100 includes an image display unit 102 for displaying the associated images and a text display unit for displaying the text.

As indicated above, according to one preferred embodiment of the automatic text input system of the current invention, the control unit 80 and the text image unit extraction unit 50 control the page turning unit 12 so that a desired portion of the textual information is efficiently inputted into the system. In other words, only a predetermined unit or portion of the bound print material needs to be inputted for the above described optical conversion process. For example, a predetermined unit or a desired portion of the text means an article in a magazine or a chapter in a book. In order to select the desired portion of the text, the text image unit extraction unit 50 determines a beginning and an ending of the desired portion and generates a set of page turning control signals. In general, a beginning is recognized by a title of a desired portion to be extracted while an ending is marked by another title of a following portion. Based upon the page turning control signal, the control unit 80 controls the page turning unit 12 so that a desired portion of the text is efficiently inputted into the system.

Still referring to FIG. 1, the preferred embodiment of the automatic text input system according to the current invention further optionally includes a search word/field input unit 30, a search unit 70 and a representative word unit 90. The search unit 70 searches a text unit that contains a search key word which is inputted via the search word/field input unit 30. Similarly, the search unit 70 also searches a text unit that contains a search word which is associated with a search key field inputted via the search word/field input unit 30. The search word/field input unit 30 has access to a field dictionary which includes a predetermined set of words associated with each of search key fields. The representative word unit 90 selects a representative word which describes the content of a specified text portion. To select the representative word, words in the specified text portion are examined for their frequency occurrence, and the most frequently occurred word is selected as the representative word. The representative word is stored as a part of the specified text portion.

Figure 2:
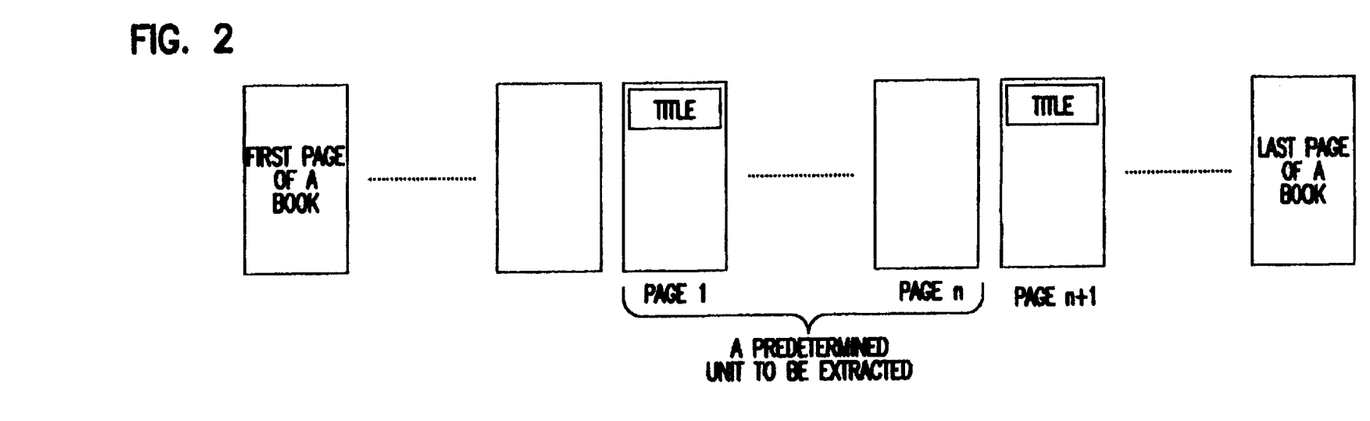
FIG. 2 diagramatically illustrates a predetermined unit of text that exists in consecutive pages in a bound material.

Now referring to FIG. 2, a specified text portion is illustrated as a part of multiple-page document such as a book which starts from a first page and ends with the last page. In general, to select a predetermined unit of text such as an article, a first page containing a title of the article is specified by detecting a title portion. Subsequent pages are considered to be a part of the article until a page containing another title which indicates an ending of the current article or a beginning of another article. Upon detecting the second title, the desired article portion is determined.

Figure 3:
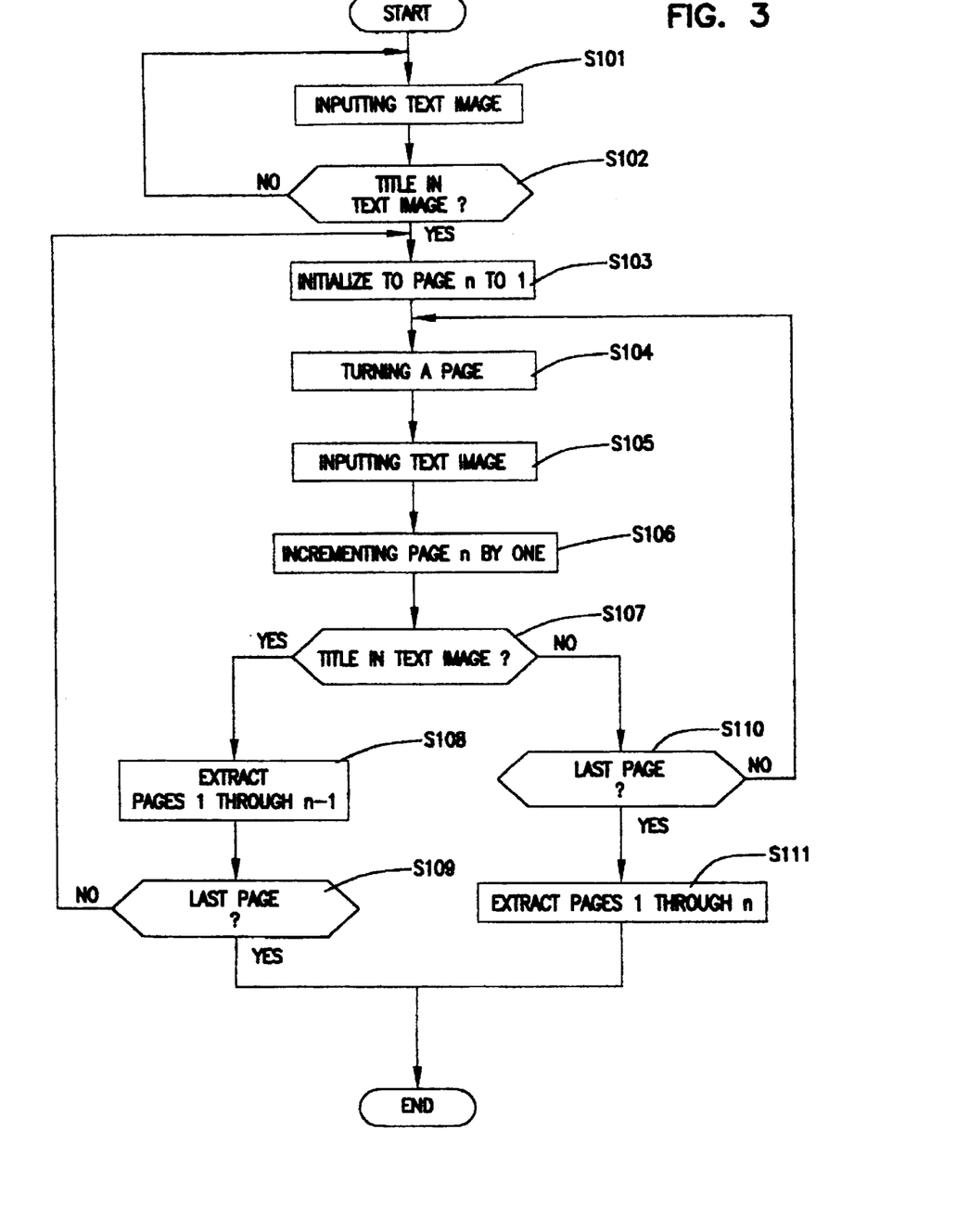
FIG. 3 is a flow chart illustrating steps involved in one preferred process of inputting text that exists in consecutive pages according to the current invention.

Referring to FIG. 3, a flow chart illustrates the steps involved in a preferred process of turning pages of a bound material according to the current invention. The preferred process is directed to turning pages of an article whose pages are consecutively bound. In a step 101, a text image on a page is scanned for an input, and in a step 102, it is determined whether a title exists in the page. One way to determine the existence of the title includes a threshold in the font size and the location or layout of the particular font size in the page. If the title does not exists, the next page is inputted. On the other hand, if the title exists, a page number n is initialized to one in a step 103. In a step 104, a new page in the bound material is turned, and in a step 105, text image on the newly turned page is now being scanned for an input. Accordingly, the page number n is incremented by one in a step 106 so as to keep track of the length of a particular text portion. In a step 107, the current text page is examined if a title exists. In case that the current page contains another title, the pages starting from page number one through n−1 are reconized as an article in a step 108. Additionally, in a step 109, it is determined if there are any pages left in the bound material. The steps 103 through 107 are repeated if the last page of the bound material has not been encountered. On the other hand, the process terminates upon encountering the last page. In case that the current page does not contain a title, it is determined if the current page is the last page of the bound material in a step 110. If the current page is the last page, the pages starting from page number one to n are now recognized as an article of the bound material and the process terminates. On the other hand, if the current page is not yet the last page, the above described steps 104 through 107 are repeated.

Figure 4:
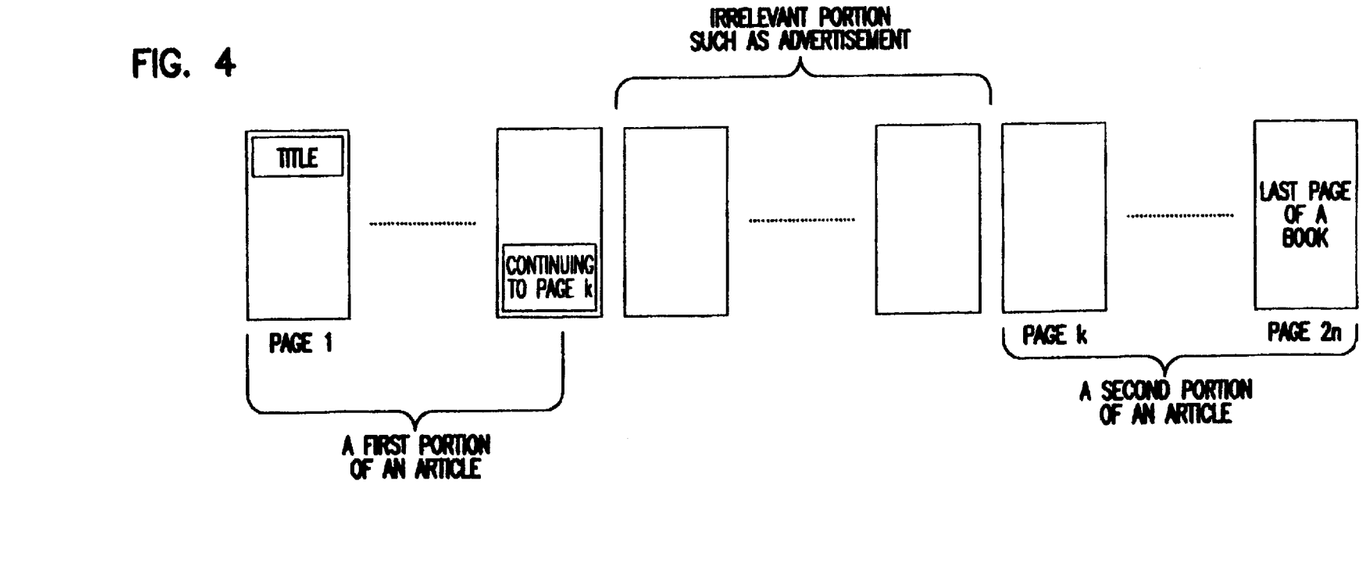
FIG. 4 diagramatically illustrates a predetermined unit of text that exists in disjointed pages in a bound material.
Figure 5:
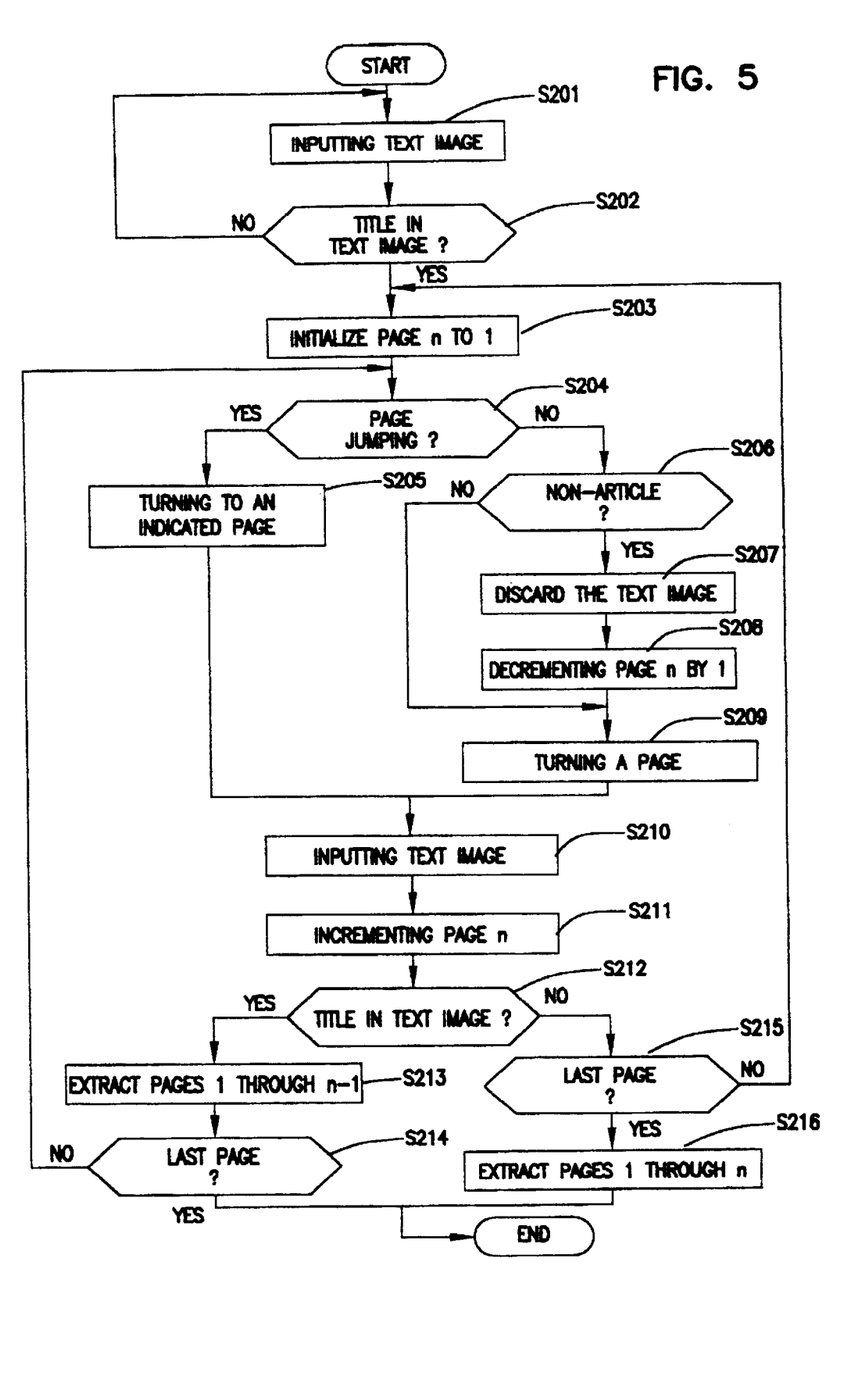
FIG. 5 is a flow chart illustrating steps involved in one preferred process of inputting text that exists in disjointed pages according to the current invention.

Now referring to FIG. 4, a specified text portion is illustrated as a part of multiple-page document such as a book which starts from a first page and ends with the last page. In general, to select a portion of a predetermined unit of text such as an article, a first page containing a title of the article is specified by detecting a title portion. Subsequent pages are considered to be a first part of the article until a page containing a page break indicator. The page break indicator generally indicates that the article is not found in continuous columns and that a subsequent page of the article starts at a distant page. Intervening pages are generally irrelevant to the article and are skipped. Thus, a second portion of the article starts at the subsequently specified page and continues till another title which indicates an ending of the current article. Upon detecting the second title, the desired article portion is determined. Referring to FIG. 5, a flow chart illustrates the steps involved in a second preferred process of turning pages of a bound material according to the current invention. In a step 201, a text image on a page is scanned for an input, and in a step 202, it is determined whether a title exists in the page. One way to determine the existence of the title includes a threshold in the font size and the location or layout of the particular font size in the page. If the title does not exists, the next page is inputted by repeating the step 201. On the other hand, if the title exists, a page number n is initialized to one in a step 203. In a step 204, it is determined whether a page break indicator exists. If the page break indicator exists, in a step 205, pages are skipped till a newly specified page in the bound material. On the other hand, in the absence of the page break indicator, it is ascertained whether the current page is an irrelevant page such as one containing advertisement in a step 206. If the current page is irrelevant to the article, the current page is ignored in a step 207 and the page number n is decremented by one in a step 208. If the current page is relevant, the process goes to a step 209 where a page is turned. In a step 210, text image on the newly turned page is now being scanned for an input. Accordingly, the page number n is incremented by one in a step 211 so as to keep track of the length of a particular text portion. In a step 212, the current text page is examined if a title exists. In case that the current page contains another title, the pages starting from page number one through n−1 are reconized as an article in a step 213. Additionaly, in a step 214, it is determined whether there are any pages left in the bound material. The steps 204 through 212 are repeated if the last page of the bound material has not been encountered. On the other hand, the process terminates upon encountering the last page. In case that the current page does not contain a title, it is determined if the current page is the last page of the bound material in a step 215. If the current page is the last page, the pages starting from page number one to n are now recognized as an article of the bound material in a step 216 and the process terminates. On the other hand, if the current page is not yet the last page, the above described steps 203 through 212 are repeated.

Figure 6A:
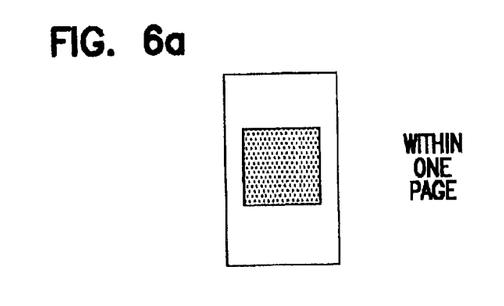
FIGS. 6A and 6B illustrate two examples of articles that do not start and or end on page boundaries.
Figure 6B:
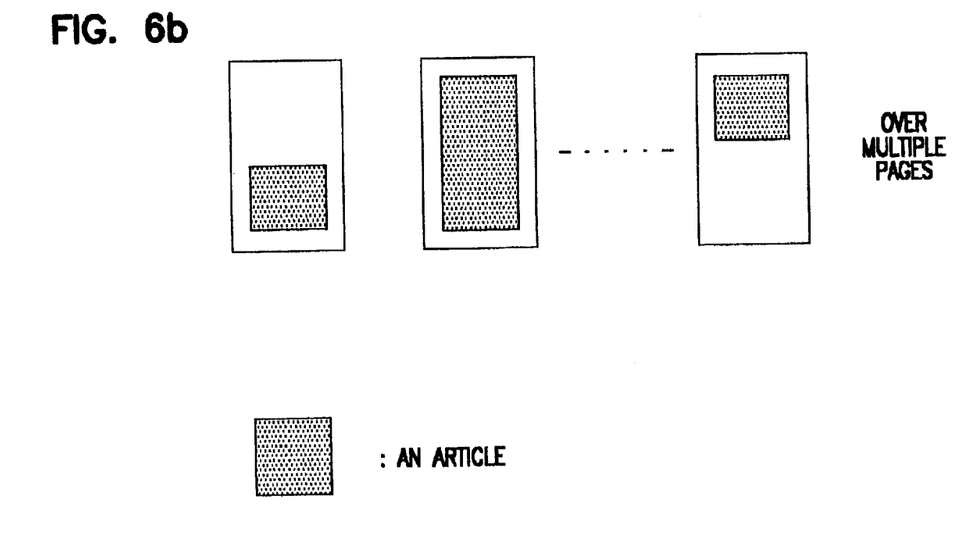

Referring to FIGS. 6A and 6B, articles as illustrated in stippled areas fail to start and end on page boundaries. In contrast to the above described examples in which each article is demarked by a title which resided at the top of a page, an article in FIG. 6A starts in the middle of the page and ends within a single page while an article in FIG. 6B starts in the middle of a first page, extends over multiple pages and ends in the middle of the page.

Figure 7:
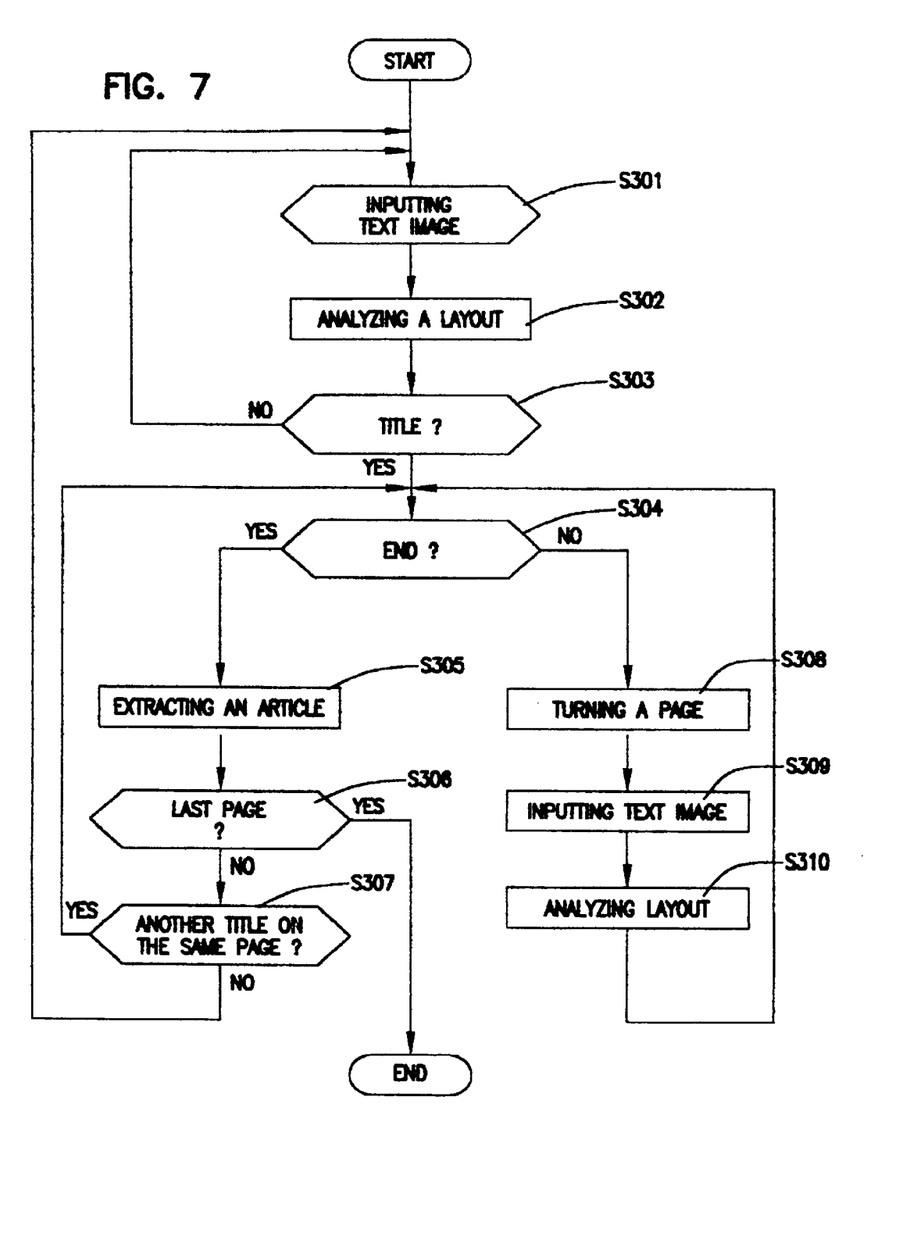
FIG. 7 is a flow chart illustrating steps involved in one preferred process of inputting text that fail to start and end on page boundaries according to the current invention.

Now referring to FIG. 7, in order to accommodate the above described layout of articles in a bound material, steps are illustrated for a third preferred process of turning pages according to the current invention. In a step 301, text image is inputted for a layout analysis in a step 302. The layout analysis includes detection of a title based upon conventional criteria such as a font size, a font type, a relative position in a page and so on. In a step 303, it is determined whether a beginning of an article is detected based upon the layout analysis. If no beginning is detected, the above described steps 301 through 303 are repeate. On the other hand, if the beginning is detected, it is determined whether an end of the same article or a beginning of a next article is detected within the same page in a step 304. In case either of the above criteria is met, the article is extracted in a step 305, and it is determined whether every page in the boud material is processed in a step 306 for completion. In case of remaining pages, in a step 307, it is determined whether a beginning of a next article exists in the current page based upon the laytout analysis. If the beginning of the next article exists, the process repeats from the step 304. In the absence of the beginning, the process goes back to the step 301. On the other hand, if the step 304 determines that an end of the same article and a beginning of a next article do not exist, the current page is turned in a step 308, and text image of the newly turned page is inputed in a step 309. Subsequently, the same layout analysis is performed on the newly turned page in a step 310 and the step 304 is repeated.

Figure 8:
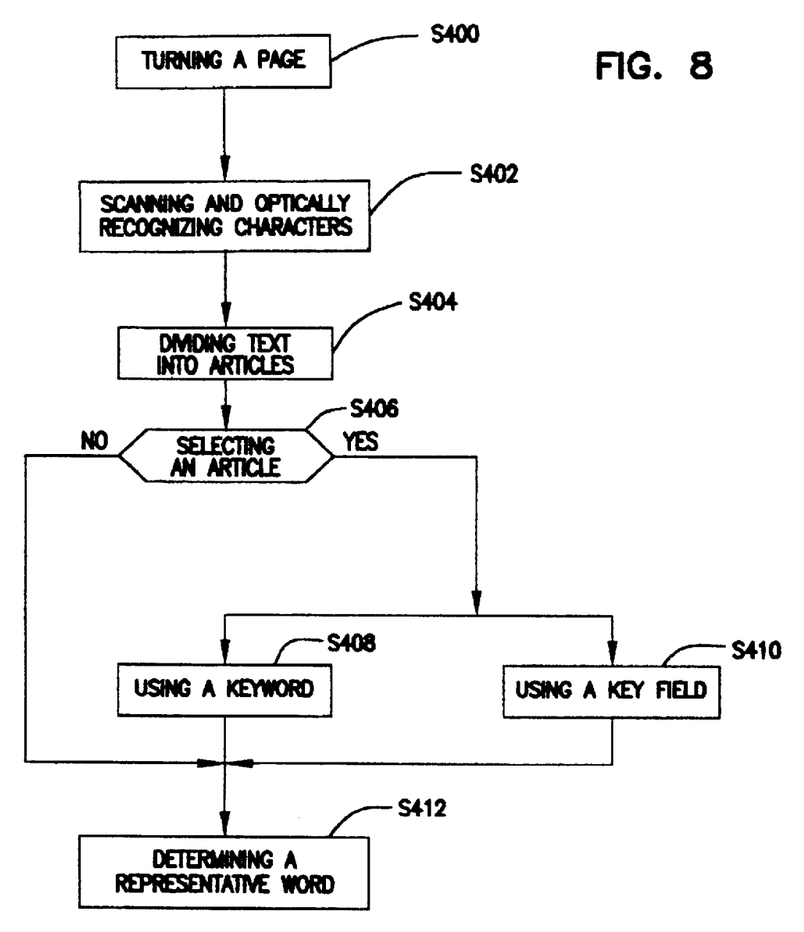
FIG. 8 is a flow chart illustrating steps involved in one preferred process of inputting selective portions of text with an added representative word according to the current invention.

Now referring to FIG. 8, a fourth preferred process of inputting text information according to the current invention further includes a step of extracting a representative word from a selected text portion. In a step 400, a page is turned, and the page is scanned for text in a step 402. The above steps are repeated for inputting a predetermined amount of text. In a step 404, based upon a layout analysis, the text is divided into articles. The layout analysis has been previously described, and the description is now hereby incorporated. In a step 406, it is determined whether any of these articles are selected. The selection of articles is accomplished by specifying a user-defined key word in a step 408 and or a user-defined key field in a step 410. A specified key word is searched in the articles in the step 408. In the alternative, a predetermined key word dictionary which contains related words for a key search word, and the related words are also used in the step 408. Similarly, a key field has a predetermined key field dictionary which contains related words for a key search field, and the related words are also used in the step 410. The selected articles are processed for its representative word in a step 412. If no selection is made in the step 406, every article is processed for its representative word in a step 412. A representative word or a set of representative words generally describes and or summarizes the corresponding article. According to one preferred process, the representative words are selected based upon a font size, a font type and frequency of occurrence of the words.

Figure 9:
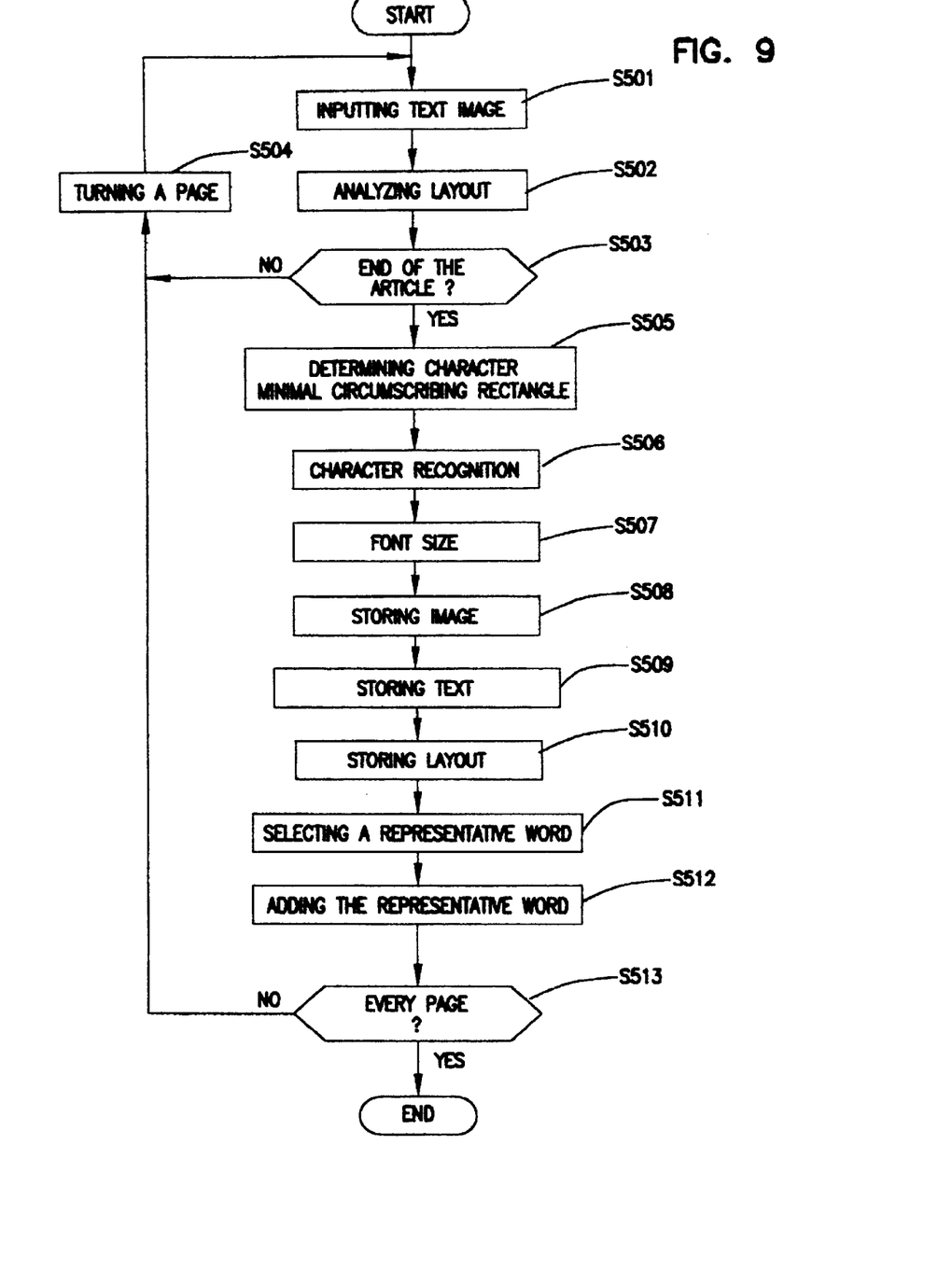
FIG. 9 is a flow chart illustrating steps involved in one preferred process of inputting text for storing certain selective information according to the current invention.

Now referring to FIG. 9, a fourth preferred process of inputting text information according to the current invention further includes a step of storing the text information with a representative word from a selected text portion. In a step 501, the page is scanned, and in a step 402 text image information is inputted. In a step 502, a layout analysis is performed, and it is determined if an entire article is extracted based upon the layout analysis in a step 503. If the article is not yet inputted, a page in a bound material is turned in a step 504. On other hand, upon the completion of an entire article, character recognition is performed in steps 505, 506 and 507. Following the conversion of the text image to character data, associated graphics is stored in a step 508 while the character data is stored in a step 509. In addition, the above layout analysis information is stored in a step 510. A representative word is determined in a step 511 and is added to the character data of the article in a step 512. Lastly, it is determined whether every page in a bound material has been processed prior to the completion of the process. If not every page is processed, a page is turned and the process repeats from the step 501.

Figure 10:
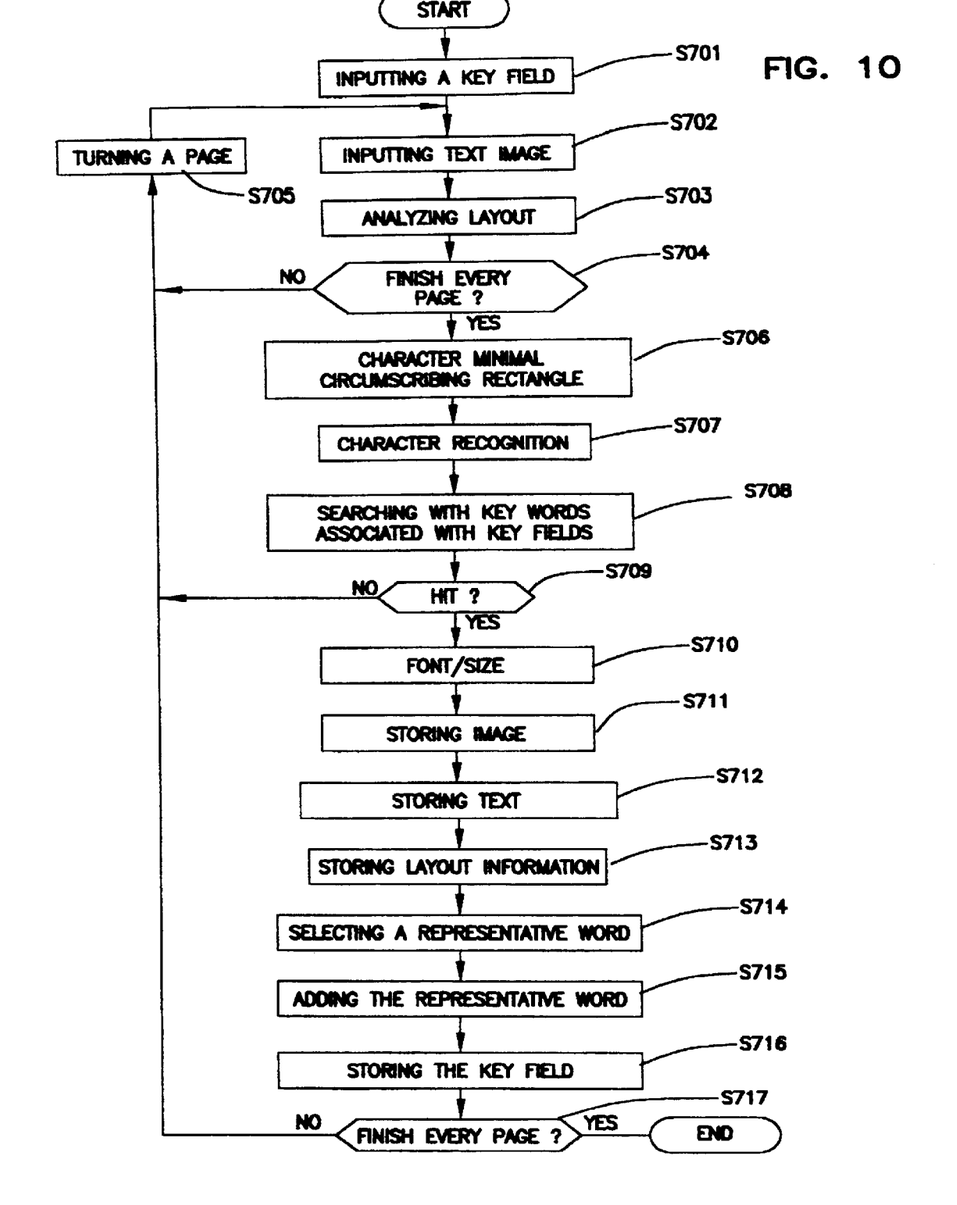
FIG. 10 is a flow chart illustrating steps involved in one preferred process of inputting text for storing certain selective information based upon a key field according to the current invention.

Referring to FIG. 10, a fifth preferred process of inputting text information according to the current invention further includes steps of selecting a text portion of the article based upon a search key field and storing the selected portion of the text information with a representative word. In a step 701, a search key field is inputted. In a step 702, the page is scanned, and in a step 702 text image information is inputted. In a step 703, a layout analysis is performed, and it is determined if an entire article is extracted based upon the layout analysis in a step 704. If the article is not yet inputted, a page in a bound material is turned in a step 705. On other hand, upon the completion of an entire article, character recognition is performed in steps 706 and 707. Following the conversion of the text image to character data, a key field search is performed based upon the inputted key field in a step 708. If there is no hit in the text, a page is turned in a step 703 and the process goes back to the step 702. On the other hand, if the key field is identified in the text. Font information is stored in a step 710. Associated graphics is stored in a step 711 while the character data is stored in a step 712. In addition, the above layout analysis information is stored in a step 713. A representative word is determined in a step 714 and is added to the character data of the article in a step 715. The key field information is also stored in a step 716. Lastly, it is determined in a step 717 wheter every page in a bound material has been processed prior to the completion of the process. If not every page is processed, a page is turned in the step 705 and the process repeats from the step 702.

Figure 11:
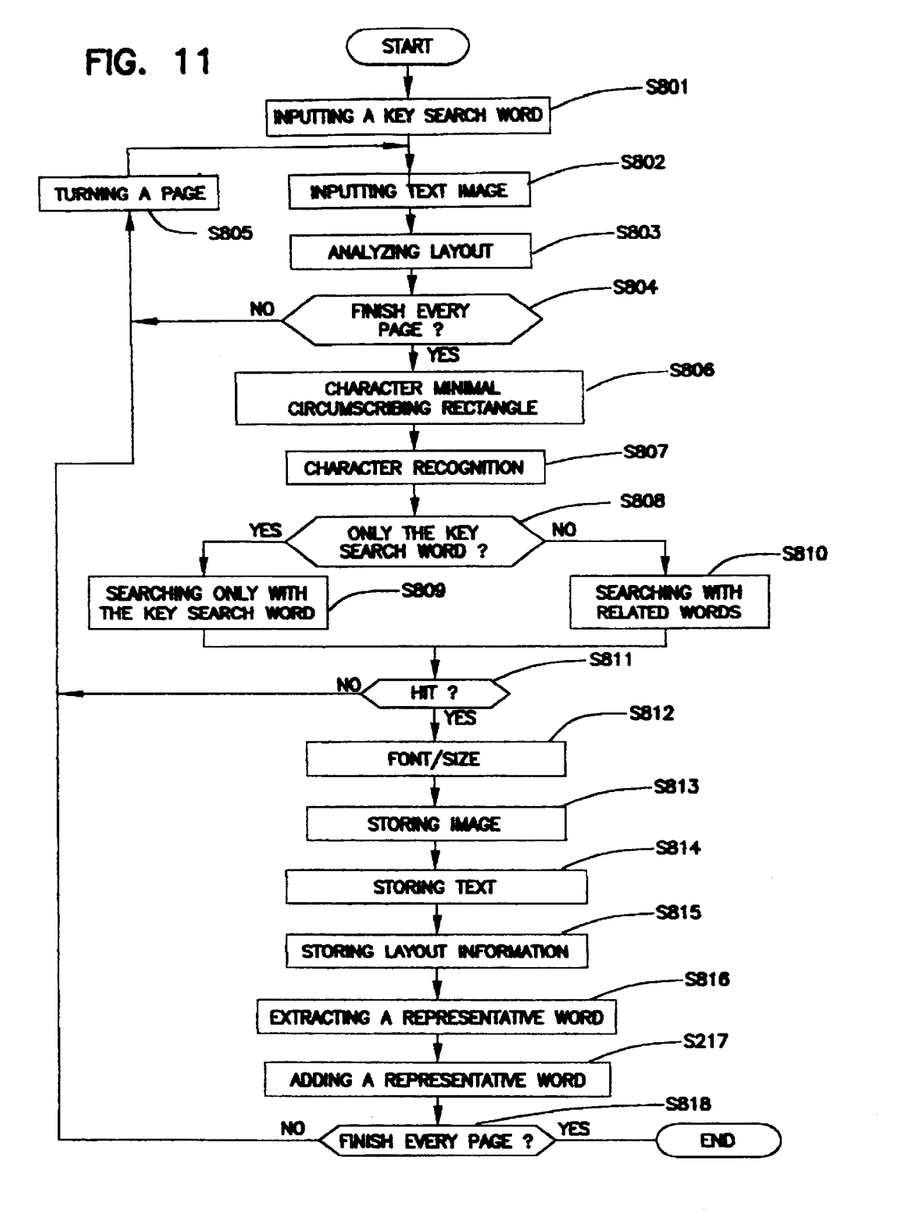
FIG. 11 is a flow chart illustrating steps involved in one preferred process of inputting text for storing certain selective information based upon a key word and or related words according to the current invention.

Referring to FIG. 11, a sixth preferred process of inputting text information according to the current invention further includes steps of selecting a text portion of the article based upon a search key word and or related words as well as storing the selected portion of the text information with a representative word. In a step 801, a search key word is inputted. In a step 802, the page is scanned, and in a step 802 text image information is inputted. In a step 803, a layout analysis is performed, and it is determined if an entire article is extracted based upon the layout analysis in a step 804. If the article is not yet inputted, a page in a bound material is turned in a step 805. On ther other hand, upon the completion of an entire article, character recognition is performed in steps 806 and 807. Following the conversion of the text image to character data, it is determined whether a key field word search or a related word search is performed in a step 808. A key word search is performed based upon the inputted key word in a step 809 while a related key word search is performed using the key word and its predetermined associated or related words in a step 910. If there is no hit in the text, a page is turned in a step 805 and the process goes back to the step 802. On the other hand, if the key word or at least one of the related words is identified in the text, font information is stored in a step 812. Associated graphics is stored in a step 813 while the character data is stored in a step 814. In addition, the above layout analysis information is stored in a step 815. A representative word is determined in a step 816 and is added to the character data of the article in a step 817. Lastly, it is determined in a step 818 wheter every page in a bound material has been processed prior to the completion of the process. If not every page is processed, a page is turned in the step 805 and the process repeats from the step 802.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of inputting text from multiple pages into a digital memory device, comprising the steps of:
    a) automatically turning a page;
    b) scanning text on the page for optically converting the text into a predetermined format of digital data;
    c) determining a break at an end of a first portion of the text based upon a predetermined key word which is followed by one or more pages containing an irrelevant portion of the text and/or graphics that is irrelevant to the first portion of the text;
    d) turning the one or more pages containing the irrelevant portion of the text and/or the graphics based upon said step c);
    e) determining an end of the irrelevant portion in the digital data, a second portion defining the text which follows the end of the irrelevant portion; and
    f) scanning the second portion of the text; and
    g) inputting the scanned text of the first and second portions of the text without the one or more pages containing the irrelevant portion of the text and/or the graphics irrelevant to the first and second portions into the digital memory device.

2. The method of inputting text according to claim 1 wherein the first portion and the second portion are an article.

3. The method of inputting text according to claim 1 wherein the first portion and the second portion are a chapter.

4. The method of inputting text according to claim 1 wherein said step e) determines the end based upon a font size.

5. The method of inputting text according to claim 4 wherein said step e) determines the end based upon a relative position of said font size.

6. The method of inputting text according to claim 1 wherein said step e) determines the end based upon a font characteristic including a font type.

7. The method of inputting text according to claim 1 wherein said step e) determines the end based upon a predetermined word.

8. The method of inputting text according to claim 7 wherein said step e) determines the end based upon a frequency of occurrence of said predetermined word.

9. The method of inputting text according to claim 7 wherein said predetermined word has a corresponding set of related words.

10. The method of inputting text according to claim 1 wherein said step e) further comprises g) adjusting certain optical conversion parameters used in said step b) based upon the digital data.

11. The method of inputting text according to claim 1 wherein said steps a) and b) are repeated a predetermined number of times prior to said step e).

12. The method of inputting text according to claim 1 further comprising additional steps in response to said step c) if no break is found:

h) determining whether the text scanned in said step b) belongs to the first portion after said step c) after no break is found;

i) discarding the text scanned in said step b) in response to said step h); and j) skipping said steps d) through g) and proceeding to step a).

13. A system for inputting text from multiple pages into a digital memory device, comprising:

an automatic page turner for automatically turning a page, each page containing text;

a scanner/optical character recognizer operationally connected to said automatic page turner for scanning the text for optically converting the text into a predetermined format of digital data;

a text divider operationally connected to said scanner/optical character recognizer for dividing said digital data into portions; and a search unit operationally connected to said scanner/optical character recognizer for determining a break at an end of a first portion of the text based upon a predetermined key word followed by one or more pages containing an irrelevant portion of text and/or graphics that is irrelevant to the first portion of the text and determining an end of the irrelevant portion, said automatic page turner turning the one or more pages containing the irrelevant portion of the text and/or the graphics.

14. The system for inputting text from multiple pages according to claim 13 wherein said search unit further determines whether or not said portion belongs to said first portion when said search unit finds no break.

15. The system for imputting text from multiple pages according to claim 13 further comprising:

a representative word selector operationally connected to said text divider for selecting a representative word for each of said portions, said text divider dividing said digital data into said portions each representing a portion of a first portion of text based upon layout.

16. The system for inputting text from multiple pages according to claim 15 wherein said text divider selectivley divides the digital data into said portions based upon a selected key word.

17. The system for inputting text from multiple pages according to claim 16 wherein said selected key word includes corresponding predetermined related words.

18. The system for inputting text from multiple pages according to claim 15 wherein said text divider selectively divides the digital data into said portions based upon a selected key field.

19. The system for inputting text from multiple pages according to claim 18 wherein said selected key field includes corresponding predetermined key words.

20. The system for inputting text from multiple pages according to claim 15 wherein said representative word selector selects said representative word based upon frequency of occurrence of a certain word in said portion.

21. The system for inputting text from multiple pages according to claim 15 wherein said representative word selector selects said representative word based upon a font size.

22. The system for inputting text from multiple pages according to claim 15 wherein said representative word selector selects said representative word based upon a font style.

* * * * *